United States Patent [19]

Rayl

[11] 4,365,353
[45] Dec. 28, 1982

[54] BODY PUPPET AND TEACHING AID

[76] Inventor: Richard N. Rayl, 6911 Via Irana, Stanton, Calif. 90680

[21] Appl. No.: 221,820

[22] Filed: Dec. 31, 1980

[51] Int. Cl.³ .............................................. A41B 1/00
[52] U.S. Cl. ......................................... 2/115; 40/586
[58] Field of Search ................. 2/115, 49 R, 118, 246, 2/1, 74, 75, 78 R, 80, 111, 113; 40/586, 618

[56]  References Cited

U.S. PATENT DOCUMENTS 2,881,447  4/1959  Shackelford ........................ 2/49 R
3,484,974 12/1969  Culmone ........................... 2/DIG. 6
4,120,053 10/1978  Nemirofsky ............................ 2/115

Primary Examiner—Doris L. Troutman
Attorney, Agent, or Firm—Kit M. Stetina

[57] ABSTRACT

A relatively simple and low-cost body puppet is disclosed comprising a garment worn about the trunk of a user which includes artwork and other indicia depicting a humanized face and mouth. The garment is formed of a substantially resilient material which when manually stretched by the hands of the user, causes the indicia on the puppet to momentarily distort and assume varying facial expressions. The body puppet of the present invention is additionally adapted to serve as a teaching aid, permitting children to non-verbally communicate with others and predict and record the actual response of a viewer.

9 Claims, 9 Drawing Figures

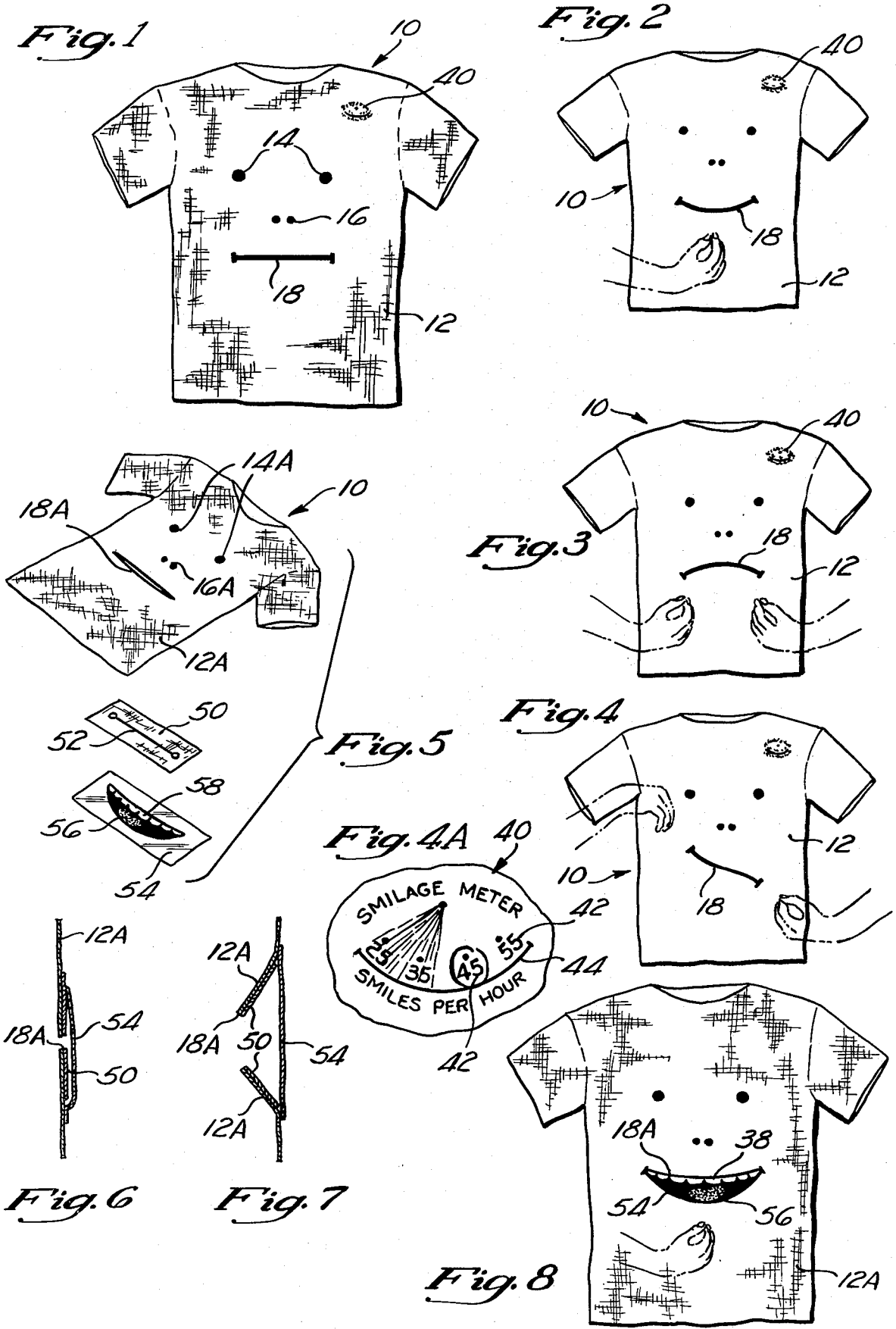

BODY PUPPET AND TEACHING AID

BACKGROUND OF THE PRESENT INVENTION

The present invention relates to puppets and, more particularly, to a garment wearable about the trunk of a user, including artwork and other indicia formed thereon depicting a humanized face and mouth, which when manually articulated by a user, causes the indicia on the puppet to momentarily assume varying facial expressions.

A variety of puppets have been disclosed in the prior art, the majority of which are worn about the hand of the user and typically manipulated between the thumb and forefingers of the hand to simulate the opening and closing of a mouth. As is well known, such prior art hand puppets usually are highly ornamented and designed to simulate a variety of fanciful characters. Although such prior art puppets have proven useful and entertaining in their general use, they typically have been relatively expensive to manufacture have required a substantial period of time on the part of a user to become proficient in their articulation, and further have necessitated the user to manually carry, store, and subsequently set up the puppet to its actual use. In addition, the prior art puppets have generally failed to integrate their use so as to be suitable for a teaching aid and have been primarily utilized merely for entertainment. As such, there exist a substantial need in the art for a relatively low-cost puppet which may be proficiently articulated by even the most inexperienced user, and conveniently carried and rapidly deployed by the user at the beginning of use of the puppet.

SUMMARY OF THE PRESENT INVENTION

The present invention specifically addresses and alleviates the above referenced deficiencies associated in the prior art. More particularly, the present invention comprises a puppet device which is formed as a garment wearable about the trunk of a user having artwork and other indicia formed thereon, depicting a humanized face and mouth. The garment is formed of a substantially resilient, fabric material which is adapted to be manually stretched by the hands of a user. By manually stretching the fabric material in differing directions, the indicia formed on the garment is momentarily distorted whereby various facial expressions are yielded which simulate human facial expressions such as a smile or frown. In view of the body puppet of the present invention being worned directly about the trunk of a user, the present invention may be rapidly deployed without any delay prior to use and further may be proficiently manipulated by even inexperience children.

In addition to the entertainment benefits made possible by its use, the body puppet of the present invention additionally is specifically adapted to be effectively utilized as a learning aid for young children. This beneficial result is made possible by the incorporation of a graph, formed directly on the body puppet which permits the user to predict and record the particular responses received from others viewing the manipulation of the body puppet. More particularly, the graph allows the user to predetermine and thus, set a goal of the number of responses desired to be received in a particular time period such as an hour, and then visually record the number of responses actually received from viewers in the time period. When the number of responses equals or exceeds the predetermined set number of responses, the user recognizes that he has achieved his goal. When the recorded number of responses is less than the predetermined set number, the user recognizes that either his initial goal was unattainable or the particular expression yielded on the body puppet was insufficient to obtain the desired response. Hence, the present invention provides a meaningful teaching aid to young children, serving to instruct the child to set achievable goals and recognize the response received from viewers pursuant to his actions.

In a second embodiment of the invention, the mouth indicia formed on the puppet is provided with an elongate slot or opening which extends through the fabric of the garment. A resilient member such as a plastic strip is bonded to the reverse or underside of the garment in the area of the slot, and serves to continuously bias the mouth indicia in a closed configuration. By manually stretching the garment fabric, the slotted mouth indicia is selectively spread to simulate the opening of a mouth and upon release of the stretching force is subsequently returned back to its initial closed position by the plastic strip. As such, in the second embodiment of the present invention, manual manipulation of the body puppet causes the puppet to appear to open and close its mouth. In addition, in the second embodiment, an additional design patch, may be bonded to the reverse or under surface of the garment in the location of the mouth indicia which includes a pictorial representation of teeth or a tongue. Thus, when the mouth of the body puppet is articulated to an open position, the underlying teeth and tongue artwork is exposed and made apparent to a viewer.

DESCRIPTION OF THE DRAWINGS

These as well as other features of the present invention will be become more apparent upon reference to the drawings wherein;

FIG. 1 is a perspective view of a first embodiment of the body puppet of the present invention depicting the facial indicia formed thereon;

FIG. 2 is a perspective view of the first embodiment of the body puppet of the present invention being manually manipulated by a user to yield a smiling facial expression;

FIG. 3 is a perspective view of the first embodiment of the present invention being manually manipulated to yield a frowning facial expression;

FIG 4 is a perspective view of the first embodiment of the present invention being manually manipulated to yield one of the various other facial expressions;

FIG. 4a is an enlarged view of a graph which may be formed directly on the body puppet to permit the present invention to be utilized as a teaching aid;

FIG. 5 is an exploded view of a second embodiment of the present invention wherein the mouth indicia formed on the garment is adapted to open and close in response to manipulation by a user;

FIG. 6 is a cross-sectional view taken about the mouth indicia of the body puppet of FIG. 5 depicting the mouth indicia in a closed configuration;

FIG. 7 is a cross-sectional view taken about the mouth indicia of the body puppet of FIG. 5 illustrating the mouth indicia in an open configuration; and FIG. 8 is a perspective view of the body puppet of FIG. 5 depicting the puppet in its open mouth configuration.

DETAILED DESCRIPTION OF THE PREFERRED EMBODIMENT

Referring to FIG. 1, there is shown the body puppet 10 of the present invention formed from a garment 12 wearable about the trunk of a user (not shown). The garment 12 is preferably formed from a substantially resilient fabric material such as cotton, which generally conforms to the trunk of a user and may be stretched or distorted upon manually pulling of the fabric in a desired direction. In the preferred embodiment, the particular garment 12 utilized for the puppet 10 of the present invention is a tee shirt; however, those skilled in the art will recognize that other garments such as sweatshirts, tank tops, sweaters, and the like, may be utilized without departing from the spirit of the present invention.

The garment 12 includes indicia depicting a humanized face which by way of example, may include a pair of eyes 14, a nose 16, and a mouth 18. Although a variety of processes may be utilized to form the indicia 14, 16 and 18 on the garment 12, the applicant has found that the preferred manner is by way of silk-screening or heat-transfer techniques which are currently being utilized in graphic tee shirt manufacturing. As shown in FIG. 1, the mouth indicia 18 is preferably formed as a substantially straight line which when worn about the trunk of a user and maintained in its laxed or unstretched configuration, yields a substantially blank facial expression for the body puppet 10.

The operation of the body puppet 10 of the present invention may be described by reference to FIGS. 2, 3, and 4, it being recognized that the body puppet 10 is being worn about the trunk of a user (not shown). When the puppet 10 is desired to be used, a user (not shown) may grasp a portion of the garment 21 with his hand (indicated by the phantom line in FIG. 2) and subsequently manually stretch the fabric material of the garment to distort the same. With specific reference to FIG. 2, by grasping the garment 12 at a location vertically below and centered along the mouth indicia 18, and manually pulling vertically downward upon the garment 12, the mouth indicia 18 may be momentarily distorted into a generally curvilinear configuration representing a happy or smiling facial expression. Similarly, by grasping the garment 12 with both hands of the user at a location laterally spaced from both ends of the mouth indicia 18, and pulling the fabric garment 12 slightly downward and outward (as depicted in FIG. 3), the mouth indicia 18 may assume a generally convex congfiguration representative of an unhappy or frowning facial expression. Alternatively, as shown in FIG. 4, the user may manually pull the fabric 12 of the garment in opposite directions thereby rendering a variety of distorted facial impressions. Thus, as will be recognized, the body puppet 10 of the present invention may be rapidly articulated by even the most inexperienced user to depict a variety of facial expressions only limited by the imagination of the particular user. Additionally, in view of the internal resiliency of the fabric material of the garment 12, upon releasing the manually applied stretching forces, the facial and mouth indicia 14, 16, and 18, returns to its original unstretched configuration exemplified respectively in FIG. 1.

In addition to the ease of articulation and entertainment features made possible by the use of the body puppet 10, it is an important feature of the present invention that the body puppet 10 is specifically adapted to be effectively utilized as a learning aid for younger users such as children. This beneficial result is made possible by the incorporation of a graph 40 which is formed directly upon the upper portion of the garment 12. As best shown in FIG. 4A, in the preferred embodiment, the graph 40 comprises a meter-like graph having plural numerals 42 positioned and scaled on a curvilinear coordinate axis 44. Although a variety of viewer responses may be recorded upon the graph, by way of example only, the graph 40 is adapted to permit the recordation of the number of smiles per hour received from others viewing the manipulation of the body puppet 10 by the user (not shown).

In the particular use of the body puppet 10 as a teaching or learning aid, the graph 40 permits the user to predetermine and, thus, set a goal of the number of desired responses received per hour and then visually record the number of particular responses actually received during use of the puppet 10. With particular reference to FIG. 4a, a child user may determine the number of smile responses per hour desired to be received and indicate the same by using a pen or pencil (not shown) to draw a mark (indicated by the phantom line circle in FIG. 4a) about the particular numeral found on the curvilinear coordinate axis 44. Subsequently, during manipulation of the tee shirt during a particular period of time, the user may observe the actual visual responses received from viewers in response to manipulation of the puppet 10 and record the same by drawing lines from the center point 46 of the graph 40 to the particular number of responses received as indicated by the phantom lines in FIG. 4a. When the number of responses equals or exceeds the preset goal marked on the graph 40, the child user recognizes that he has achieved his goal. Alternatively, when the recorded number of responses is less than the predetermined goal, the user recognizes that his initial goal was either too high or the particular expression depicted on the puppet by manipulation of the user was insufficient to obtain the desired response. Hence, the body puppet 10 of the present invention provides a meaningful teaching aid to young children serving to instruct the child to set achievable goals and record and recognize the responses received pursuant to his actions (i.e., manipulation of the puppet). In the preferred embodiment, the particular pen or pencil utilized to mark the graph 40 is water and detergent soluable, thereby permitting the body puppet 10 to be re-used as a teaching aid merely by washing the garment 12 between consecutive uses.

In FIGS. 5 through 8, a second embodiment of the body puppet 10 of the present invention is depicted which, as with the first embodiment of FIG. 1, is formed of a fabric garment 12A having suitable eyes, nose and mouth indicia 14A, 16A and 18A, respectively. In this second embodiment, the mouth indicia 18A includes an elongate slot which extends laterally along its length such that when the fabric 12A is manipulated, the mouth indicia 18A separates or spreads thereby simulating the opening and closing of the mouth of the puppet 10. To provide a biasing force which aids in maintaining the mouth indicia 18 in an initial closed position, a biasing patch 50 formed of a substantially semi-rigid material such as a polymer, plastic, or cardboard material is rigidly affixed to the undersurface of the garment 12A in the vicinity of the mouth indicia 18A. As best shown in FIGS. 5 and 6, the biasing patch 50 includes an elongated slot 52 which is registered with the slot formed in the mouth indicia 18A. In view of the semirigid material properties of the patch 50, the fabric material of the garment 12A is selectively rigidified in the locality of the mouth indicia 18A and maintained in substantially closed orientation indicated in FIG. 6. Preferably an additional graphic patch 54 having art work and other indicia representing a tongue 56 and teeth 58 is underlaid beneath the biasing patch 50 and bonded about its peripheral portion to the undersurface of the garment 12A. Preferably, the graphic patch 50 is formed having a vertical dimension slightly greater than the dimensions of the biasing patch 50 such that the biasing patch 50 and fabric garment 12A in the vicinity of the mouth indicia 18A may be spread or stretched without the underlying graphic patch 54 as depicted in FIG. 7.

By this particular construction of the second embodiment of the body puppet of the present invention, it will be recognized that by manually grasping the garment 12A at a location vertically below the mouth indicia 18A and applying a downward force upon the garment 12A as depicted in FIG. 8, the slot formed in the mouth indicia 18A and biasing patch 50 selectively spread open and permit the viewing of the underlying design patch 54. As such, the teeth indicia 58 and tongue indicia 56 may be viewed. Subsequently, upon releasing the downward opening force, the biasing patch 50 being rigidly attached to the underlying portion of the mouth indicia 18A returns the garment 12A in the area of the mouth indicia 18A back to its original unstretched configuration as depicted in FIG. 6. As such, in this second embodiment of the present invention, the body puppet 10 simulates the opening and closing of a mouth.

In summary, the present invention provides a relatively inexpensive and low-cost body puppet which may be proficiently utilized by even inexperienced users and further may be utilized effectively as a teaching aid. Those skilled in the art will recognize that although in the preferred embodiment, particular configurations of the mouth, eyes, and nose indicia have ben depicted, variations to the actual configuration of the indicia may be readily made without departing from the spirit of the present invention. In addition, those skilled in the art will recognize that the teachings of the present invention are additionally applicable to animal indicia which when manually manipulated simulate particular animal motion such as the flying of a bird or the running of a horse.

What is claimed is:

1. A body puppet comprising:
   a garment sized to be worn about the body of a user;
   indicia formed on said garment depicting a humanized face,
   said garment formed of a sufficiently resilient fabric material so that when said garment is manually stretched by said user, said indicia momentarily distorts to assume varying facial expressions on said puppet; and
   an elongate slot formed through said garment and aligned with a portion of said indicia corresponding to the mouth of said humanized face, said slot adapted to permit said garment to spread apart in the vicinity of said portion of said indicia when said garment is manually stretched to simulate the opening of the mouth of said puppet.

2. The body puppet of claim 1 further comprising means attached to said garment in the vicinity of said elongate slot to biasingly return said garment back to an initial unstretched position to simulate the closing of the mouth of said puppet.

3. The body puppet of claim 2 wherein said biasingly return means comprises a substantially rigid patch adhered to the undersurface of said garment and including a slot aligned and registered with the elongate slot formed through said garment.

4. The body puppet of claim 3 further comprising a patch member including indicia formed thereon representing the inside of a mouth, said patch member attached to the undersurface of said garment and positioned in said vicinity of said elongate slot so that when said garment is spread apart, said indicia representing said inside of said mouth may be viewed through said elongate slot.

5. The body puppet of claim 4 wherein said garment is formed of cotton fabric material.

6. The body puppet of claim 5 wherein said garment comprises a T shirt which closely conforms to the trunk of said user.

7. A body puppet comprising:
   a garment sized to be worn about the trunk of a user;
   indicia formed on said garment depicting a character;
   an elongate aperture formed through said garment and aligned with a portion of said indicia, and
   a patch attached to the undersurface of said garment and positioned in the vicinity of said elongate aperture;
   said garment formed of a sufficiently resilient material so that when said garment is manually stretched by said user, said indicia momentarily distorts to simulate animation of the character and said aperture is formed to permit said garment to spread apart in the vicinity of said portion of said indicia when said garment is manually stretched to reveal said patch through said elongate aperture.

8. The body puppet of claim 7 further comprising means attached to said garment in the vicinity of said elongate aperture to biasingly return said garment back to an initial unstretched position and cover said patch.

9. The body puppet of claim 8 wherein said biasingly return means comprises a plastic patch fastened to the undersurface of said garment and including a slot aligned and registered with said elongate aperture formed through said garment.

* * * * *